(12) United States Patent
Song et al.

(10) Patent No.: US 9,232,529 B2
(45) Date of Patent: Jan. 5, 2016

(54) NODE AND METHOD FOR TRANSMISSION MODE SWITCHING FOR DOWNLINK TRANSMISSION IN DOWNLINK CHANNEL

(75) Inventors: Xinghua Song, Beijing (CN); Yu Qian, Beijing (CN); Hai Wang, Beijing (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 109 days.

(21) Appl. No.: 14/128,221

(22) PCT Filed: Jul. 1, 2011

(86) PCT No.: PCT/CN2011/001087
§ 371 (c)(1),
(2), (4) Date: Dec. 20, 2013

(87) PCT Pub. No.: WO2013/003973
PCT Pub. Date: Jan. 10, 2013

(65) Prior Publication Data
US 2014/0119223 A1    May 1, 2014

(51) Int. Cl.
| | |
|---|---|
| *G01R 31/08* | (2006.01) |
| *H04W 72/08* | (2009.01) |
| *H04W 76/04* | (2009.01) |
| *H04L 1/00* | (2006.01) |
| *H04B 7/04* | (2006.01) |
| *H04B 7/06* | (2006.01) |

(52) U.S. Cl.
CPC ............ *H04W 72/085* (2013.01); *H04B 7/0689* (2013.01); *H04L 1/0015* (2013.01); *H04W 76/046* (2013.01); *H04B 7/0417* (2013.01); *H04B 7/0617* (2013.01); *H04B 7/0671* (2013.01)

(58) Field of Classification Search
CPC ....... H04B 7/00; H04B 7/0689; H04W 76/04; H04W 76/046; H04W 72/00; H04W 72/04; H04W 72/085
See application file for complete search history.

(56) References Cited

U.S. PATENT DOCUMENTS

| | | | |
|---|---|---|---|
| 7,660,706 B2 * | 2/2010 | Cao et al. | 703/2 |
| 2004/0203465 A1 * | 10/2004 | Goldstein et al. | 455/67.13 |
| 2005/0286410 A1 * | 12/2005 | Truong et al. | 370/216 |
| 2012/0093061 A1 * | 4/2012 | Charbit et al. | 370/315 |

FOREIGN PATENT DOCUMENTS

WO      2010036519 A1    4/2010

OTHER PUBLICATIONS

ETSI, "LTE; Evolved Universal Terrestrial Radio Access (E-UTRA); Physical Channels and Modulation", ETSI TS 136 211 V8,7,0, Jun. 2009, 87 pages.
Forenza, "Adaptive MIMO Transmission Scheme: Exploiting the Spatial Selectivity of Wireless Channels", IEEE VTC, vol. 5. 2005, pp. 2188-2192.

* cited by examiner

*Primary Examiner* — Anh Ngoc Nguyen
(74) *Attorney, Agent, or Firm* — Patent Portfolio Builders, PLLC

(57) ABSTRACT

The present invention discloses a node for transmission mode switching for downlink transmission in a downlink channel (100), comprising: a configuring unit (110) adapted to configure an initial transmission mode for the downlink transmission as a default transmission mode; a deriving unit (120) adapted to derive channel quality metric (CQM) of the downlink channel; a first determining unit (130) adapted to determine a first predefined threshold on the basis of link level simulation of a first transmission mode and a second transmission mode; and a first switching unit (140) adapted to switch the transmission mode from the initial transmission mode to the first transmission mode or the second transmission mode on the basis of the CQM and the first predefined threshold. The present invention provides a simple, direct and efficient approach for transmission mode switching for downlink transmission in a downlink channel on the basis of available feedback from UE (or other kinds of terminals if appropriate) and/or link adaptation decisions from eNB (or other kinds of base stations if appropriate), provides high peak rate while maintaining cell coverage, and provides a proprietary solution without any impact on protocol/standard or UE implementation.

26 Claims, 6 Drawing Sheets

NODE AND METHOD FOR TRANSMISSION MODE SWITCHING FOR DOWNLINK TRANSMISSION IN DOWNLINK CHANNEL

CROSS REFERENCE TO RELATED APPLICATION(S)

This application is a 35 U.S.C. §371 National Phase Entry Application from PCT/CN2011/001087 filed Jul. 1, 2011, the disclosure of which is incorporated by reference.

TECHNICAL FIELD

The present invention generally relates to the field of wireless communication, and more particularly relates to a node and method for transmission mode switching for downlink transmission in a downlink channel.

BACKGROUND

In wireless communication, different transmission modes have been defined for downlink transmission in downlink channels. In principle, different transmission modes are suitable for different scenarios (antenna setup, radio environment, terminal speed, etc).

A conventional method for transmission mode switching is disclosed in A. Forenza, A. Pandharipande, etc, "Adaptive MIMO Transmission Scheme: Exploiting the Spatial Selectivity of Wireless Channels", IEEE VTC, pp. 2188-2192, vol. 5, Stockholm, Sweden, 2005, wherein an adaptive transmission scheme was proposed for multiple-input and multiple-output (MIMO) systems. The condition number of the spatial correlation matrix was used as an indicator of the spatial selectivity of the channel. Meanwhile, distribution of the condition number is used to identify the prevailing channel environment. Depending on the identified channel state, it adaptively chooses the MIMO transmission scheme, among spatial multiplexing, double space-time transmit diversity, and beamforming to maximize the throughput.

The major drawback with this solution is complexity. First, the conditional number of the spatial correlation matrix has to be calculated for each user which relies on eigen value decomposition (EVD). Furthermore, in order to get an accurate distribution of the condition number, a large number of EVD computations are required. This imposes a high burden on the system especially at high system load. Second, for each channel state, different Signal to Interference and Noise Ratio (SINR) thresholds should be determined for each of the available modulation and coding scheme. This needs a lot of link-level simulations. Another problem with this solution is accuracy. It categorizes the propagation scenarios into four typical cases depending on the degree of spatial selectivity, where in reality the propagation environments are quite complicated and might not be fitted into these given categories.

SUMMARY

An object of the present invention is to provide a node and method for transmission mode switching for downlink transmission in a downlink channel, which obviates at least some of the above-mentioned disadvantages.

According to a first aspect of the present invention, there is provided a node for transmission mode switching for downlink transmission in a downlink channel. The node comprises a configuring unit adapted to configure an initial transmission mode for the downlink transmission as a default transmission mode, a deriving unit adapted to derive channel quality metric (CQM) of the downlink channel, a first determining unit 130 adapted to determine a first predefined threshold on the basis of link level simulation of a first transmission mode and a second transmission mode, and a first switching unit adapted to switch the transmission mode from the initial transmission mode to the first transmission mode or the second transmission mode on the basis of the CQM and the first predefined threshold.

Optionally, the node further comprises a second switching unit adapted to switch, in a periodical manner, the transmission mode between the first transmission mode and the second transmission mode on the basis of the comparison of the CQM with a second predefined threshold or a third predefined threshold, or a third switching unit adapted to switch, in a periodical manner, the transmission mode between the first transmission mode and the second transmission mode on the basis of link adaptation decision for the downlink channel.

Optionally, the downlink channel is a physical downlink shared channel (PDSCH) for Long Term Evolution (LTE) system.

Optionally, the default transmission mode is transmission mode 2 (TM2) of transmit diversity, the first transmission mode is transmission mode 3 (TM3) of open-loop spatial multiplexing including a mode of transmit diversity with rank 1 and a mode of large delay cyclic delay diversity (CDD) precoding with rank 2, and the second transmission mode is transmission mode 7 (TM7) of single-layer beamforming.

Optionally, the deriving unit is adapted to derive the CQM on the basis of channel quality indicator (CQI) reported by a user equipment (UE) and/or the link adaptation decision, in which the link adaptation decision is provided at evolved Node B (eNB).

Optionally, the first determining unit comprises a first simulation unit adapted to perform first link level simulation for the mode of large delay CDD precoding with rank 2 included in the TM3 of open-loop spatial multiplexing with different stream isolation levels, a second simulation unit adapted to perform second link level simulation for the TM7 of single-layer beamforming with different beamforming gains; a second determining unit adapted to determine a specific stream isolation level for the mode of large delay CDD precoding and a third determining unit adapted to determine a specific beamforming gain for the TM7 of single-layer beamforming, and a fourth determining unit adapted to determine, on the basis of results of the first and second link level simulation, a CQM of a cross point where the mode of large delay CDD precoding and the TM7 of single-layer beamforming have the same CQM and spectrum efficiency, as the first predefined threshold.

Optionally, the second determining unit comprises a utilizing unit adapted to utilize different default stream levels until the UE reports a rank 2 CQI, and a fifth determining unit adapted to determine the specific stream isolation level by comparing the rank 2 CQI with a respective rank 1 CQI.

Optionally, the third determining unit is adapted to determine the specific beamforming gain on the basis of measurement of a sound reference signal or uplink data transmission corresponding to the downlink transmission.

Optionally, the first switching unit comprises a deciding unit adapted to decide whether the CQM is greater than the first predefined threshold, a fourth switching unit adapted to switch the transmission mode from the initial transmission mode to the first transmission mode if the CQM is greater than the first predefined threshold, and a fifth switching unit adapted to switch the transmission mode from the initial transmission mode to the second transmission mode if the CQM is not greater than the first predefined threshold.

Optionally, the second switching unit comprises a sixth switching unit adapted to switch the first transmission mode to the second transmission mode if it is decided that the CQM is less than the third predefined threshold for a given period of time under the first transmission mode, and a seventh switching unit adapted to switch the second transmission mode to the first transmission mode if it is decided that the CQM is greater than the second predefined threshold for the given period of time under the second transmission mode, wherein the second predefined threshold is greater than the first predefined threshold, and the first predefined threshold is greater than the third predefined threshold.

Optionally, the period for switching the transmission mode between the first transmission mode and the second transmission mode is one or more UE measurement report periods.

Optionally, the CQM is equivalent signal-to-interference-plus-noise ratio (SINR) corresponding to the mode of transmit diversity with rank 1 included in the TM3 of open-loop spatial multiplexing.

According to a second aspect of the present invention, there is provided an evolved Node B (eNB) for Long Term Evolution (LTE) system, comprising the node according to the present invention.

According to a third aspect of the present invention, there is provided a method of transmission mode switching for downlink transmission in a downlink channel. The method comprises the steps of configuring an initial transmission mode for the downlink transmission as a default transmission mode, deriving channel quality metric (CQM) of the downlink channel, determining a first predefined threshold on the basis of link level simulation of a first transmission mode and a second transmission mode, and switching the transmission mode from the initial transmission mode to the first transmission mode or the second transmission mode on the basis of the CQM and the first predefined threshold.

Optionally, the method further comprises switching, in a periodical manner, the transmission mode between the first transmission mode and the second transmission mode on the basis of the comparison of the CQM with a second predefined threshold or a third predefined threshold, or on the basis of link adaptation decision for the downlink channel.

Optionally, the downlink channel is a physical downlink shared channel (PDSCH) for Long Term Evolution (LTE) system.

Optionally, the default transmission mode is transmission mode 2 (TM2) of transmit diversity, the first transmission mode is transmission mode 3 (TM3) of open-loop spatial multiplexing including a mode of transmit diversity with rank 1 and a mode of large delay cyclic delay diversity (CDD) precoding with rank 2, and the second transmission mode is transmission mode 7 (TM7) of single-layer beamforming.

Optionally, the step of deriving CQM of the downlink channel comprises deriving the CQM on the basis of channel quality indicator (CQI) reported by a user equipment (UE) and/or the link adaptation decision, in which the link adaptation decision is provided at evolved Node B (eNB).

Optionally, the step of determining a first predefined threshold on the basis of link level simulation of a first transmission mode and a second transmission mode comprises the steps of: performing first link level simulation for the mode of large delay CDD precoding with rank 2 included in the TM3 of open-loop spatial multiplexing with different stream isolation levels, performing second link level simulation for the TM7 of single-layer beamforming with different beamforming gains, determining a specific stream isolation level for the mode of large delay CDD precoding and a specific beamforming gain for the TM7 of single-layer beamforming, and determining, on the basis of results of the first and second link level simulation, a CQM of a cross point where the mode of large delay CDD precoding and the TM7 of single-layer beamforming have the same CQM and spectrum efficiency, as the first predefined threshold.

Optionally, the step of determining a specific stream isolation level for the mode of large delay CDD precoding comprises the steps of: utilizing different default stream levels until the UE reports a rank 2 CQI, and determining the specific stream isolation level by comparing the rank 2 CQI with a respective rank 1 CQI.

Optionally, the step of determining a specific beamforming gain for the TM7 of single-layer beamforming comprises determining the specific beamforming gain on the basis of measurement of a sound reference signal or uplink data transmission corresponding to the downlink transmission.

Optionally, the step of switching the transmission mode from the initial transmission mode to the first transmission mode or the second transmission mode on the basis of the CQM and the first predefined threshold comprises the steps of deciding whether the CQM is greater than the first predefined threshold, switching the transmission mode from the initial transmission mode to the first transmission mode if the CQM is greater than the first predefined threshold, and switching the transmission mode from the initial transmission mode to the second transmission mode if the CQM is not greater than the first predefined threshold.

Optionally, the step of switching the transmission mode between the first transmission mode and the second transmission mode on the basis of the comparison of the CQM with a second predefined threshold or a third predefined threshold comprises the steps of: switching the first transmission mode to the second transmission mode if it is decided that the CQM is less than the third predefined threshold for a given period of time under the first transmission mode, and switching the second transmission mode to the first transmission mode if it is decided that the CQM is greater than the second predefined threshold for the given period of time under the second transmission mode, wherein the second predefined threshold is greater than the first predefined threshold, and the first predefined threshold is greater than the third predefined threshold.

Optionally, the period for switching the transmission mode between the first transmission mode and the second transmission mode is one or more UE measurement report periods.

Optionally, the CQM is equivalent signal-to-interference-plus-noise ratio (SINR) corresponding to the mode of transmit diversity with rank 1 included in the TM3 of open-loop spatial multiplexing.

According to a fourth aspect of the present invention, there is provided a computer program product, comprising a computer readable medium, having stored thereon computer executable codes, when executed, causing a processor to perform the method according to the present invention.

According to a fifth aspect of the present invention, there is provided a computer readable medium, having stored thereon computer executable codes, when executed, causing a processor to perform the method according to the present invention.

The present invention provides a simple, direct and efficient approach for transmission mode switching for downlink transmission in a downlink channel on the basis of available feedback from UE (or other kinds of terminals if appropriate) and/or link adaptation decisions from eNB (or other kinds of base stations if appropriate), provides high peak rate while maintaining cell coverage, and provides a proprietary solution without any impact on protocol/standard or UE implementation.

BRIEF DESCRIPTION OF THE DRAWINGS

The accompanying drawings are included to provide a further understanding of embodiments and are incorporated in and constitute a part of this description. The drawings illustrate embodiments and together with the description serve to explain principles of embodiments. The elements of the drawings are not necessarily to scale relative to each other. Like reference numerals designate corresponding similar parts. It should be expressly understood that the drawings are included for illustrative purposes and do not in any manner limit the scope of the present invention.

DETAILED DESCRIPTION

In the following description, for purposes of explanation rather than limitation, specific details, such as the particular architecture, structure, techniques, etc., are set forth for illustration. However, it will be apparent to those of ordinary skill in the art that other embodiments that depart from these specific details would still be understood to be within the scope of the present invention. Moreover, for the purpose of clarity, detailed descriptions of well-known devices, circuits, and methods are omitted so as not to obscure the description of the present invention. It is to be understood that the features of the various exemplary embodiments described herein may be combined with each other, unless specifically noted otherwise.

Figure 1:
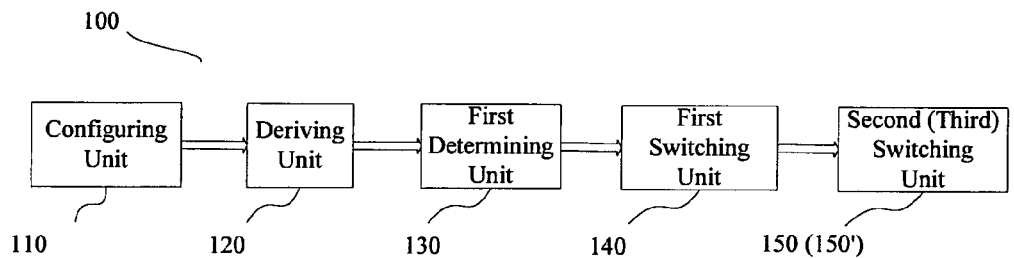
FIG. 1 is a block diagram illustrating a node for transmission mode switching for downlink transmission in a downlink channel according to an embodiment of the present invention.

FIG. 1 is a block diagram illustrating a node 100 for transmission mode switching for downlink transmission in a downlink channel according to an embodiment of the present invention. As shown in FIG. 1, the node comprises a configuring unit 110, a deriving unit 120, a first determining unit 130, a first switching unit 140, and a second (third) switching unit 150 (150').

Hereinafter, the present invention will be described with respect to downlink transmission in a physical downlink shared channel (PDSCH) for Long Term Evolution (LTE). However, such description is only exemplary, rather than restrictive, and the present invention may mutatis mutandis apply to downlink transmission in other kinds of downlink channels and communication protocols/standards, such as GSM (Global System for Mobile Communication), WCDMA (Wideband CDMA), CDMA2000, WiFi (Wireless Fidelity), WiMAX (Worldwide Interoperability for Microwave Access), etc.

In LTE, different multi-antenna transmission modes have been defined for PDSCH (see for example 3GPP TS 36.211: "Evolved Universal Terrestrial Radio Access (E-UTRA); Physical channels and modulation", V8.7.0), such as Transmission Mode (TM) 1 (single-antenna port), TM2 (transmit diversity), TM3 (open-loop spatial multiplexing), TM4 (closed-loop spatial multiplexing), TM7 (single-layer beamforming) etc. In particular, TM3 is rank-adaptive transmission including a mode of transmit diversity with rank 1 and a mode of large delay cyclic delay diversity (CDD) precoding with rank 2. TM7 is single-layer beamforming on the basis of antenna port 5 and supported in LTE Rel-8.

As described above, different transmission modes are suitable for different scenarios (antenna setup, radio environment, terminal speed, etc). For example, transmit diversity (TM2), the most robust mode, is the fallback mode under extremely bad propagation scenarios (large pathloss, severe interference, high terminal speed, etc). Hereinafter, the present invention will be described with respect to adaptive transmission mode switching between two transmission modes: open-loop spatial multiplexing (TM3) and single-layer beamforming (TM7). However, such description is only exemplary, rather than restrictive, and the present invention may mutatis mutandis apply to transmission mode switching between other transmission modes.

TM3 (open-loop spatial multiplexing), especially the mode of large delay cyclic delay diversity (CDD) precoding (rank 2) is suitable for users with good channel quality and rich scattering, where spatial multiplexing gain could be explored. TM7 (single-layer beamforming) is favorable for closely-spaced antenna array which is beneficial for cell-edge users with low signal quality. Based on the above analysis, it is obvious that TM3 could provide higher peak rate while TM7 could provide higher cell-edge user performance. Those skilled in the art may naturally think of taking advantage of the two modes.

In LTE, the transmission mode is configured and reconfigured through radio resource control (RRC) signaling (AntennaInfoDedicated: transmissionMode) (see for example 3GPP TS 36.331: "Evolved Universal Terrestrial Radio Access (E-UTRA); Radio Resource Control (RRC)", V9.2.0). RRC signaling often has relative long delays, typically in the order of hundred milliseconds. As a result, over-frequent mode reconfiguration should be avoided.

In general, there are three kinds of operations related to transmission mode configuration depending on the state of user equipment (UE): default transmission mode configuration, initial transmission mode configuration, and transmission mode reconfiguration.

The default transmission mode will be configured for UEs who have not built up RRC connections. Depending on the number of physical broadcast channel (PBCH) antenna ports, the following transmission modes will be configured as default transmission mode:

1 antenna port: TM1 (single-antenna port; port 0)
2,4 antenna ports: TM2 (transmit diversity)

When the UE comes into RRC_connected state, an initial transmission mode should be configured. In the ideal case, it will be good to select the most suitable transmission mode based on the radio propagation conditions of the concerned UE, e.g. TM3 for cell-center users and TM7 for cell-edge users.

The transmission mode should be reconfigured for the UE when propagation condition for this UE changes and current transmission mode does not fit the scenario any more. This functionality is implemented in radio link control/media access control (RLC/MAC) layer at evolved Node B (eNB) and should be triggered by certain measurement process, and corresponding RRC messages are generated and conveyed to the concerned UE.

As described above, an initial transmission mode should be selected for UEs entering RRC_connected state. However, the RRC_connection are established after the random access procedure, and there is not much channel quality metric (CQM) kind of UE measurement reports at this moment. Therefore, for simplicity the initial transmission mode can be configured as the default transmission mode. According to the present invention, the configuring unit 110 comprised in the node 100 is adapted to configure the initial transmission mode for the downlink transmission as the default transmission mode. Optionally, the default transmission mode and thus the initial transmission mode are configured as TM2.

As shown in FIG. 1, the node 100 further comprises a deriving unit 120, which is adapted to derive channel quality metric (CQM) of the downlink channel. An effective CQM is used as the criteria for transmission mode selection. One example of CQM is the equivalent SINR corresponding to transmit diversity (TxD). Hereinafter, the present invention will be described with respect to SINR. However, such description is only exemplary, rather than restrictive, and other suitable parameters can be employed as CQM in the present invention.

Optionally, the deriving unit 120 can adopt the following two approaches to derive SINR of the downlink channel.

Figure 2:
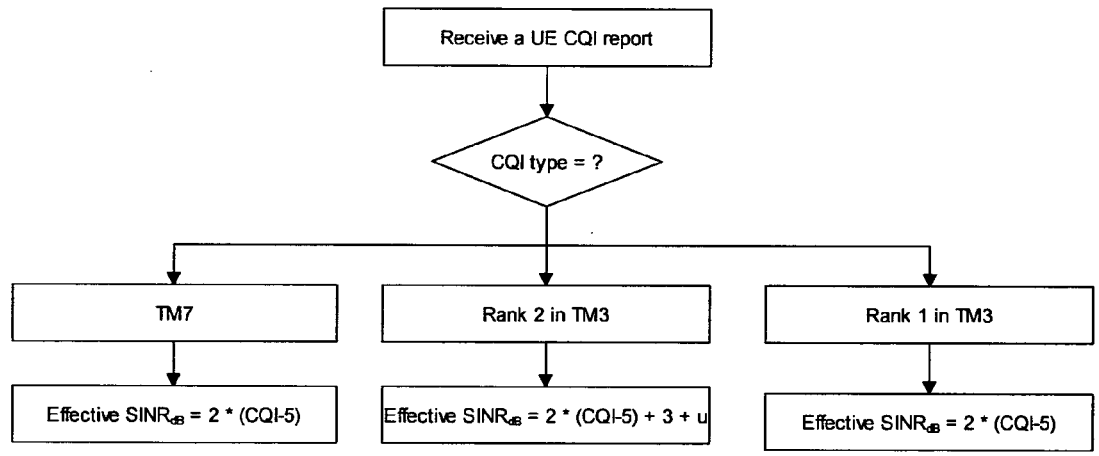
FIG. 2 is a flow chart illustrating a process of deriving SINR by means of channel quality indicator (CQI) index reported by a UE according to an embodiment of the present invention.

FIG. 2 is a flow chart illustrating a process of deriving SINR by means of channel quality indicator (CQI) index reported by a UE according to an embodiment of the present invention. As shown in FIG. 2, the deriving unit 120 firstly receives a UE CQI report from the UE, which contains the CQI index. Then, the deriving unit 120 decides the CQI type on the basis of the CQI index. Thus, on the basis of whether the CQI type is TM7, rank 2 in TM3, or rank 1 in TM3, the deriving unit 120 determines the effective SINR in decibel as 2*(CQI−5), 2*(CQI−5)+3+u, or 2*(CQI−5), respectively, wherein u is inter-stream interference and can be for instance selected as between 0 and 3.

Figure 3:
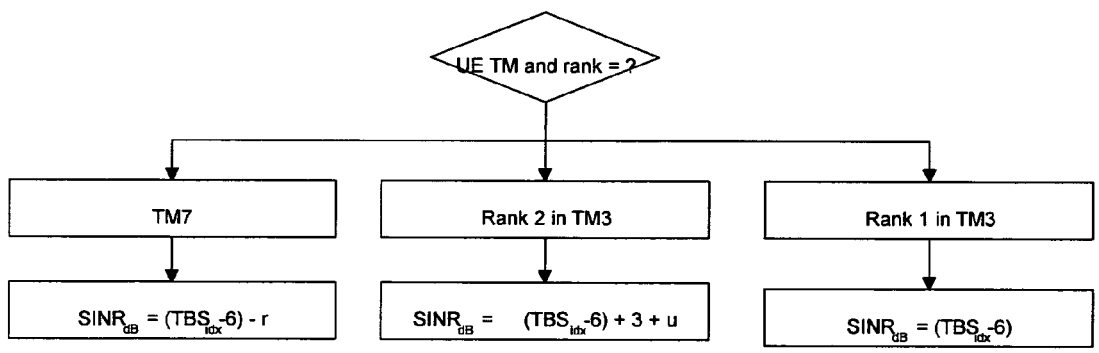
FIG. 3 is a flow chart illustrating a process of deriving SINR by means of link adaptation decision according to an embodiment of the present invention.

FIG. 3 is a flow chart illustrating a process of deriving SINR by means of link adaptation decision according to an embodiment of the present invention. As shown in FIG. 3, the deriving unit 120 firstly decides the transmission mode (and rank) of a UE on the basis of the link adaptation decision provided at eNB after outer-loop adjustment to overcome unreliable CQI report. Then, on the basis of whether the transmission mode (and rank) of the UE is TM7, Rank 2 in TM3, or Rank 1 in TM3, the deriving unit 120 determines the SINR in decibel as $(TBS_{idx}-6)-r$, $(TBS_{idx}-6)+3+u$, or $(TBS_{idx}-6)$, wherein $TBS_{idx}$ represents transport block size index, u is inter-stream interference and can be for instance selected as between 0 and 3, and r is beamforming gain and can be for instance selected as between 5 and 9.

Alternatively, the deriving unit 120 can adopt the combination of the two approaches as described above with reference to FIGS. 2 and 3 to derive SINR of the downlink channel.

The node 100 further comprises a first determining unit 130, which is adapted to determine a first predefined threshold on the basis of link level simulation of a first transmission mode and a second transmission mode. TM3 and TM7 are selected as the first transmission mode and the second transmission mode respectively for exemplary, rather than restrictive purpose, as mentioned above.

Figure 4:
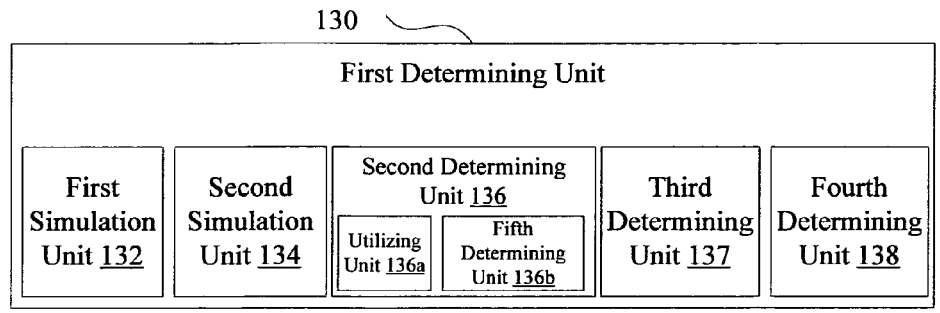
FIG. 4 is a block diagram illustrating a first determining unit comprised in the node according to an embodiment of the present invention.

FIG. 4 is a block diagram illustrating the first determining unit 130 comprised in the node 100 according to an embodiment of the present invention. As shown in FIG. 4, the first determining unit 130 comprises a first simulation unit 132, a second simulation unit 134, a second determining unit 136, a third determining unit 137, and a fourth determining unit 138.

According to an embodiment of the present invention, the first simulation unit 132 is adapted to perform first link level simulation for the mode of large delay CDD precoding (rank 2 in TM3) with different stream isolation levels, and the second simulation unit 134 is adapted to perform second link level simulation for single-layer beamforming (SLBF) (TM7) with different beamforming gains. Further, a link level simulation is performed for the mode of transmit diversity (TxD) (rank 1 in TM3). Optionally, downlink transmission with 20 MHz bandwidth (100 physical resource blocks (PRBs) allocated for data) and 2 orthogonal frequency division multiplexing (OFDM) symbols for Packet Data Control Channel (PDCCH) (control format indicator (CFI)=2) is considered in the above link level simulation, and in order to get a fair simulation result, an equivalent transmit diversity based SINR is used to indicate the link quality. Port 0 and port 1 are allocated for rank 1 in TM3 and rank 2 in TM3, while port 5 is allocated for TM7.

According to an embodiment of the present invention, the second determining unit 136 is adapted to determine a specific stream isolation level for the mode of large delay CDD precoding (rank 2 in TM3).

Optionally, the second determining unit 136 comprises a utilizing unit 136a and a fifth determining unit 136b. The utilizing unit 136a is adapted to utilize different default stream levels until the UE reports a rank 2 CQI. Optionally, the default stream isolation level may be perfect stream isolation level (stream SINR is 3 dB worse than that in transmit diversity (0 dB) due to power split for 2 steams transmission) and poor stream isolation (stream SINR is 6 dB worse than that in transmit diversity (0 dB) due to power split for 2 steams transmission and inter-stream interference). And when the UE reports a rank 2 CQI, the fifth determining unit 136b is adapted to determine the specific stream isolation level by comparing the rank 2 CQI with a respective rank 1 CQI (0 dB).

According to an embodiment of the present invention, the third determining unit 137 is adapted to determine a specific beamforming gain for the TM7. Optionally, such determination is on the basis of measurement of a sound reference signal or uplink data transmission corresponding to the downlink transmission.

Optionally, an additional beamforming gain of 6 dB or 9 dB on top of a working point is assumed considering the typical antenna setup (eight cross-polarized antennas, half-wavelength spacing between adjacent antenna elements). Those skilled in the art should be aware that more resource elements are occupied as overhead in TM7 due to dedicated reference signal (DRS), thereby the coding rate is higher in TM7 compared to that in rank 1 in TM3. As a result, TM7 needs about 1 dB higher SINR than rank 1 in TM3, in order to achieve the same spectrum efficiency, if we exclude the beamforming gain.

According to an embodiment of the present invention, the fourth determining unit 138 is adapted to determine, on the basis of results of the first and second link level simulation, a CQM of a cross point where rank 2 in TM3 and TM7 have the same CQM and spectrum efficiency, as the first predefined threshold.

Figure 5:
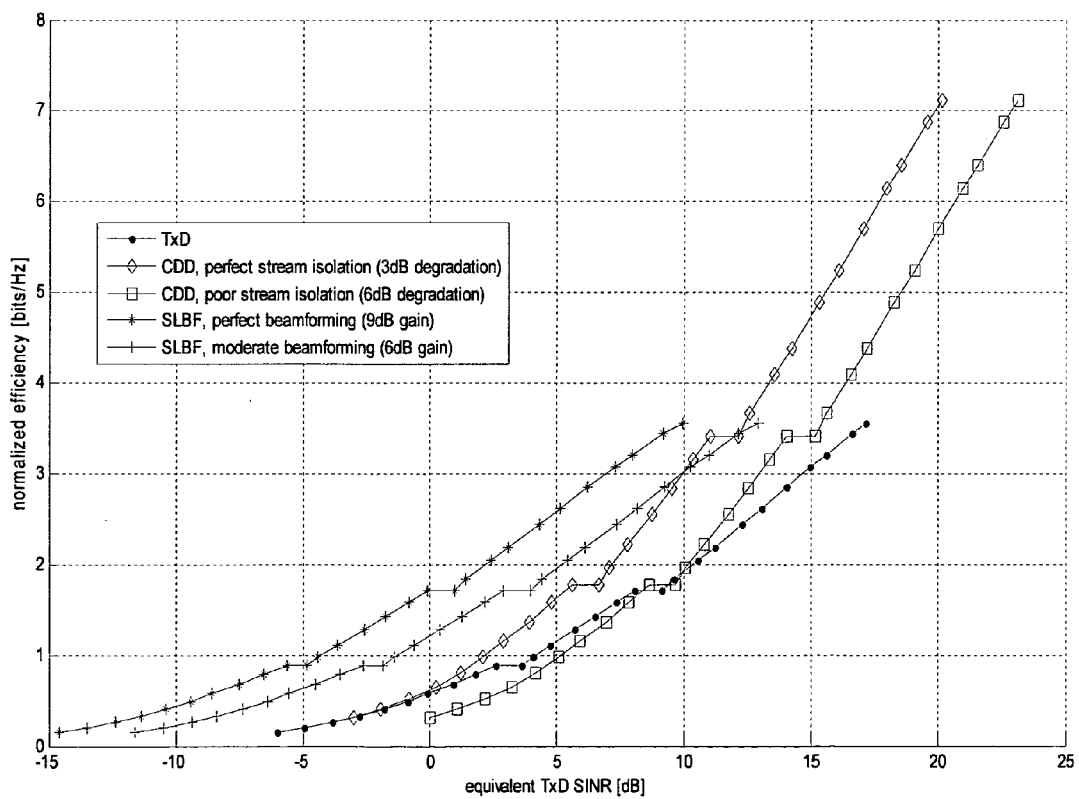
FIG. 5 is a simulation graph illustrating normalized efficiency vs. equivalent TxD SINR for a first transmission mode and a second transmission mode according to an embodiment of the present invention.

FIG. 5 is a simulation graph illustrating normalized efficiency vs. equivalent TxD SINR for rank 1 and rank 2 in TM3 and TM7 according to an embodiment of the present invention. From the link-level analysis given in FIG. 5, it can be seen that single-layer beamforming (SLBF) (TM7) (for both 6 dB and 9 dB beamforming gain) is always better than transmit diversity (TxD) (rank 1 in TM3) in all SINR levels. This implies that the additional beamforming gain provides larger throughput benefit than the cost of the UE-specific pilot (DRS) overhead.

Moreover, if with perfect stream isolation (3 dB), the performance of large delay cyclic delay diversity (CDD) (rank 2 in TM3) will outperform the single-layer beamforming (TM7) when the SINR is above 12 dB. If with poor stream isolation (6 dB), the performance of rank 2 in TM3 will outperform the TM7 when the SINR is above 15 dB. This is to be expected since spatial multiplexing gain could be explored in good SINR regions. Thus, the first predefined thresholds (i.e., the CQM of cross points) for the above two cases are 12 dB and 15 dB respectively.

Referring back to FIG. 1, the node 100 further comprises a first switching unit 140, which is adapted to switch the transmission mode from the initial transmission mode to the first transmission mode (TM3) or the second transmission mode (TM7) on the basis of the CQM and the first predefined threshold.

Figure 6:
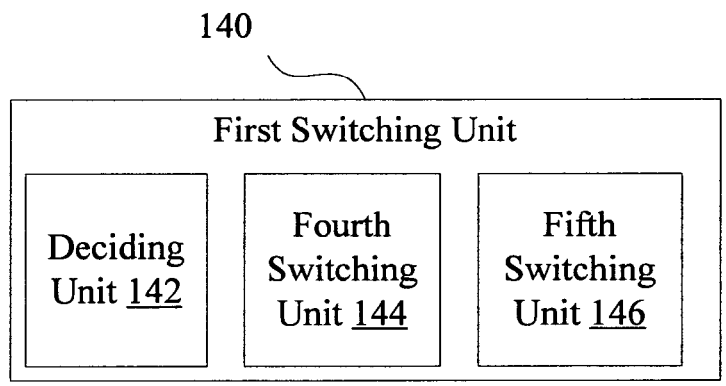
FIG. 6 is a block diagram illustrating a first switching unit according to an embodiment of the present invention.

FIG. 6 is a block diagram illustrating the first switching unit 140 according to an embodiment of the present invention. As shown in FIG. 6, the first switching unit 140 comprises a deciding unit 142, a fourth switching unit 144, and a fifth switching unit 146.

Optionally, the deciding unit 142 is adapted to decide whether the CQM is greater than the first predefined threshold, wherein the CQM is for example the SINR of the downlink channel derived by the two approaches as described above with reference to FIGS. 2 and 3.

Optionally, the fourth switching unit 144 is adapted to switch the transmission mode from the initial transmission mode to TM3 if the CQM is greater than the first predefined threshold, and the fifth switching unit 146 is adapted to switch the transmission mode from the initial transmission mode to TM7 if the CQM is not greater than the first predefined threshold.

Referring back to the above link-level analysis as illustrated in FIG. 5, it is indicated that the eNB should select either rank 2 in TM3 or TM7 for the concerned UE, i.e. when the SINR is lower than 12 dB or 15 dB, TM7 should be selected; while the SINR is above 12 dB or 15 dB, rank 2 in TM3 should be selected. By doing that, the spectrum efficiency could be maximized. Note that although the above analysis is performed under given assumptions (100 PRBs allocated for data, CFI=2, etc), similar conclusions can be found under other assumptions.

However, there are also some special cases that need to be considered, e.g., when the sounding reference signal (SRS) is power limited either due to improper sounding band configuration or the UE has a large pathloss or deep fading from the serving eNB. In this case, the performances of single-layer beamforming (TM7) will be greatly degraded due to the large error in uplink channel estimation which breaks down the channel reciprocity. Therefore, transmit diversity (rank 1 in TM3) should be used instead of single-layer beamforming (TM7). However, if the adaptive SRS bandwidth can be applied, this case can be avoided to a large extent.

Referring back to FIG. 1, the node 100 further comprises a second switching unit 150. Optionally, the second switching unit 150 is adapted to switch, in a periodical manner, the transmission mode between the first transmission mode (TM3) and the second transmission mode (TM7) on the basis of the comparison of the CQM with a second predefined threshold or a third predefined threshold. The above transmission mode switching between TM3 and TM7 can be performed when significant propagation condition changes happen.

Figure 7:
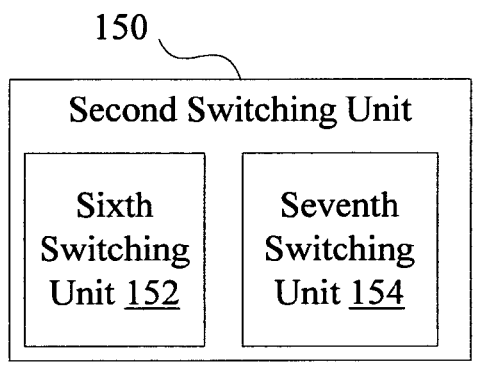
FIG. 7 is a block diagram illustrating the second switching unit according to an embodiment of the present invention.

FIG. 7 is a block diagram illustrating the second switching unit 150 according to an embodiment of the present invention. As shown in FIG. 7, the second switching unit 150 comprises a sixth switching unit 152 and a seventh switching unit 154.

Optionally, the sixth switching unit 152 is adapted to switch TM3 to TM7 if it is decided that the CQM is less than the third predefined threshold for a given period of time under TM3, and the seventh switching unit 154 is adapted to switch TM7 to TM3 if it is decided that the CQM is greater than the second predefined threshold for the given period of time under TM7, wherein the second predefined threshold is greater than the first predefined threshold, and the first predefined threshold is greater than the third predefined threshold.

That is, a periodical measurement process of CQM is applied and switching (reconfiguration) between TM3 and TM7 will be triggered when the CQM is less or greater than the predefined third threshold or second threshold for a sufficient long time period. Mathematically, the CQM is periodically updated at eNB. Optionally, the period for switching the transmission mode between TM3 and TM7 is one or more UE measurement report periods.

In order to avoid over-frequent mode switching (reconfiguration), i.e., the ping-pong effect, hysteresis is applied. Further, the above mentioned settings that the second predefined threshold is greater than the first predefined threshold and the first predefined threshold is greater than the third predefined threshold are also made to avoid over-frequent mode switching (reconfiguration). The difference between the second predefined threshold and the first predefined threshold, and the difference between the first predefined threshold and the third predefined threshold can be fixed values, or adaptive to the expected transmission mode switching frequency.

Alternatively, the node 100 may comprise a third switching unit 150' in place of the second switching unit 150, which is adapted to switch, in a periodical manner, the transmission mode between the first transmission mode (TM3) and the second transmission mode (TM7) on the basis of link adaptation decision for the downlink channel.

Figure 8:
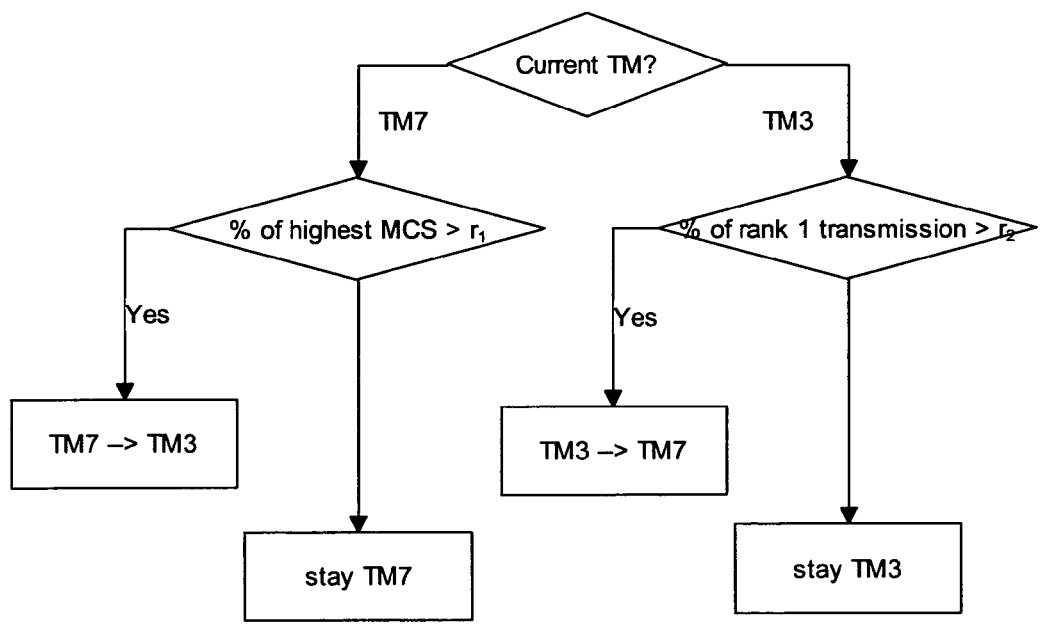
FIG. 8 is a flow chart illustrating a process of switching between the first transmission mode and the second transmission mode on the basis of link adaptation decision for the downlink channel performed by a third switching unit according to an embodiment of the present invention.

FIG. 8 is a flow chart illustrating a process of switching between the first transmission mode (TM3) and the second transmission mode (TM7) on the basis of link adaptation decision for the downlink channel performed by the third switching unit 150' according to an embodiment of the present invention. As shown in FIG. 8, the third switching unit 150' firstly decides the current transmission mode. If the current transmission mode is TM7, the third switching unit 150' determines whether the percentage of highest modulation and coding scheme (MCS) for the transmission mode is greater than $r_1$, and if positive, the third switching unit 150' switches the transmission mode from TM7 to TM3, and if negative, the transmission mode can stay in TM7. Further, if the current transmission mode is TM3, the third switching unit 150' determines whether the percentage of rank 1 transmission is greater than $r_2$, and if positive, the third switching unit 150' switches the transmission mode from TM3 to TM7, and if negative, the transmission mode can stay in TM3. The above mentioned parameters $r_1$ and $r_2$ are two thresholds decided by experience values.

According to an embodiment of the present invention, there is also provided an evolved Node B (eNB) for Long Term Evolution (LTE) system, comprising the node according to the present invention.

Figure 9:
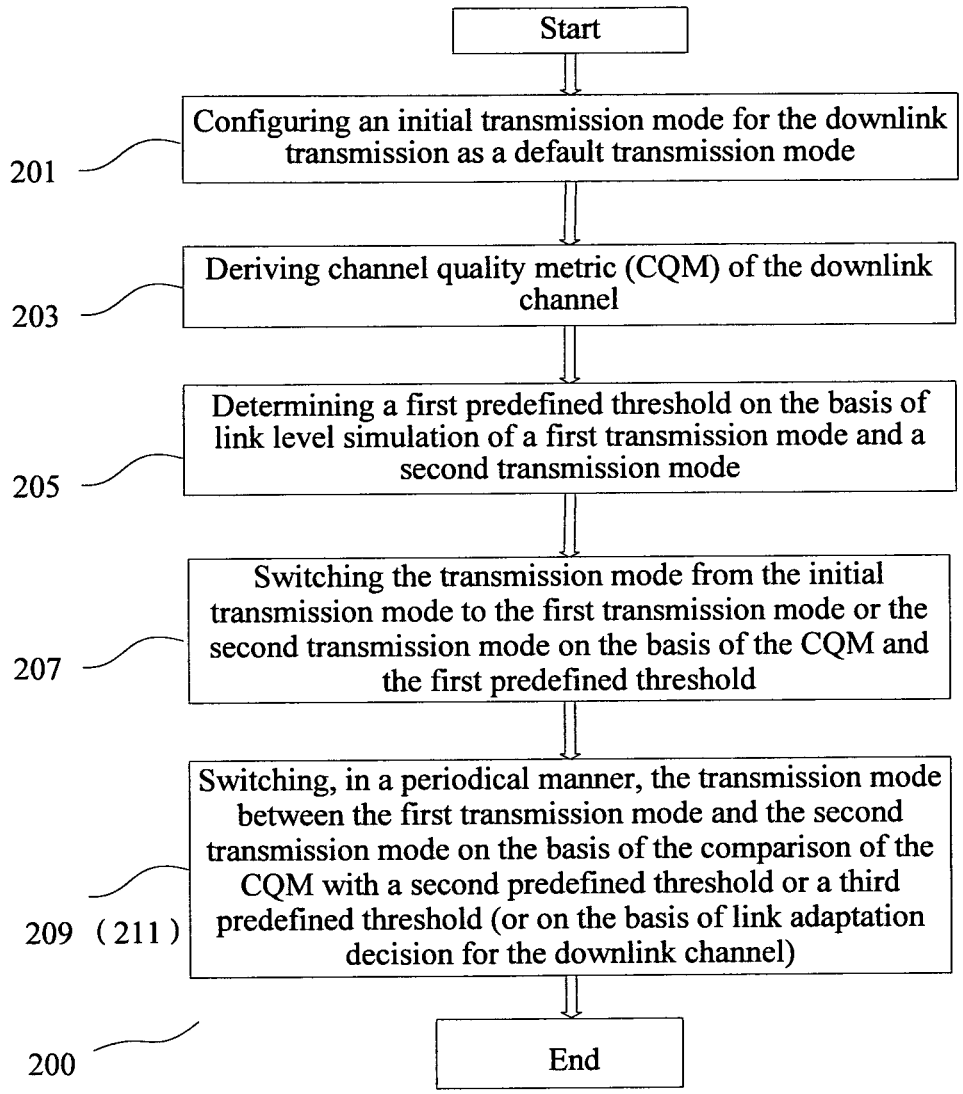
FIG. 9 is a flow chart illustrating a method of transmission mode switching for downlink transmission in a downlink channel according to an embodiment of the present invention.

FIG. 9 is a flow chart illustrating a method 200 of transmission mode switching for downlink transmission in a downlink channel according to an embodiment of the present invention. Optionally, the method 200 can be performed by the above-described node 100 according to the present invention. Hereinafter, the present invention will be described with respect to downlink transmission in a physical downlink shared channel (PDSCH) for Long Term Evolution (LTE). However, such description is only exemplary, rather than restrictive, and the present invention may mutatis mutandis apply to downlink transmission in other kinds of downlink channels and communication protocols/standards, such as GSM (Global System for Mobile Communication), WCDMA (Wideband CDMA), CDMA2000, WiFi (Wireless Fidelity), WiMAX (Worldwide Interoperability for Microwave Access), etc. Further, hereinafter, the present invention will be described with respect to adaptive transmission mode switching between two transmission modes: open-loop spatial multiplexing (TM3) and single-layer beamforming (TM7), as described above. Also, such description is only exemplary, rather than restrictive, and the present invention may mutatis mutandis apply to transmission mode switching between other transmission modes.

As shown in FIG. 9, the method 200 begins with a step 201 of configuring an initial transmission mode for the downlink transmission as a default transmission mode. Optionally, the step 201 can be performed by the above-described configuring unit 110 of the node 100 according to the present invention. Optionally, the default transmission mode and thus the initial transmission mode are configured as TM2, as described above with respect to the configuring unit 110.

Then, in a step 203, channel quality metric (CQM) of the downlink channel is derived. Optionally, the step 203 can be performed by the above-described deriving unit 120 of the node 100 according to the present invention. An effective CQM is used as the criteria for transmission mode selection. One example of CQM is the equivalent SINR corresponding to transmit diversity (TxD). Hereinafter, the present invention will be described with respect to SINR. However, such description is only exemplary, rather than restrictive, and other suitable parameters can be employed as CQM in the present invention.

Optionally, the step 203 comprises deriving the SINR on the basis of channel quality indicator (CQI) reported by a user equipment (UE) and/or the link adaptation decision, in which the link adaptation decision is provided at evolved Node B (eNB). The above description of the example of deriving the SINR on the basis of CQI reported by UE and/or the link adaptation decision provided at eNB made with reference to FIGS. 2 and 3 also applies to the step 203, and is thus not iterated for the sake of conciseness.

Then, in a step 205, a first predefined threshold is determined on the basis of link level simulation of a first transmission mode and a second transmission mode. Optionally, the step 205 can be performed by the above-described first determining unit 130 of the node 100 according to the present invention. TM3 and TM7 are selected as the first transmission mode and the second transmission mode respectively for exemplary, rather than restrictive purpose, as mentioned above.

Figure 10:
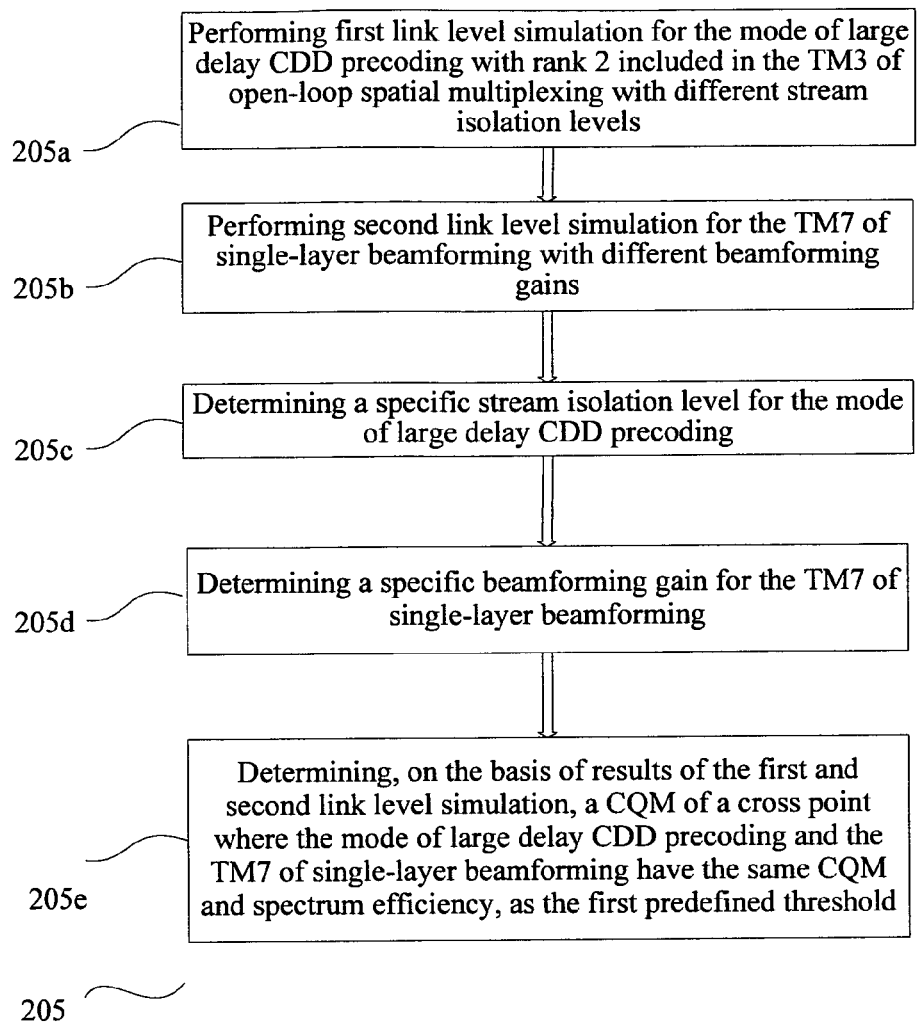
FIG. 10 is a flow chart illustrating a step of determining a first predefined threshold on the basis of link level simulation of the first transmission mode and the second transmission mode according to an embodiment of the present invention.

FIG. 10 is a flow chart illustrating the step 205 of determining a first predefined threshold on the basis of link level simulation of the first transmission mode and the second transmission mode according to an embodiment of the present invention.

The step 205 begins with a sub-step 205a, wherein first link level simulation for the mode of large delay CDD precoding (rank 2 in TM3) with different stream isolation levels is performed. Optionally, the sub-step 205a can be performed by the above-described first simulation unit 132 comprised in the first determining unit 130 of the node 100 according to the present invention. Then, in a sub-step 205b, second link level simulation for single-layer beamforming (SLBF) (TM7) with different beamforming gains is performed. Optionally, the sub-step 205b can be performed by the above-described second simulation unit 134 comprised in the first determining unit 130 of the node 100 according to the present invention. Further, a link level simulation is performed for the mode of transmit diversity (TxD) (rank 1 in TM3).

Optionally, downlink transmission with 20 MHz bandwidth (100 physical resource blocks (PRBs) allocated for data) and 2 orthogonal frequency division multiplexing (OFDM) symbols for Packet Data Control Channel (PDCCH) (control format indicator (CFI)=2) is considered in the above link level simulation, and in order to get a fair simulation result, an equivalent transmit diversity based SINR is used to indicate the link quality. Port 0 and port 1 are allocated for rank 1 in TM3 and rank 2 in TM3, while port 5 is allocated for TM7.

Then, in a sub-step 205c, a specific stream isolation level for the mode of large delay CDD precoding (rank 2 in TM3) is determined. Optionally, the sub-step 205c can be performed by the above-described second determining unit 136 comprised in the first determining unit 130 of the node 100 according to the present invention.

Figure 11:
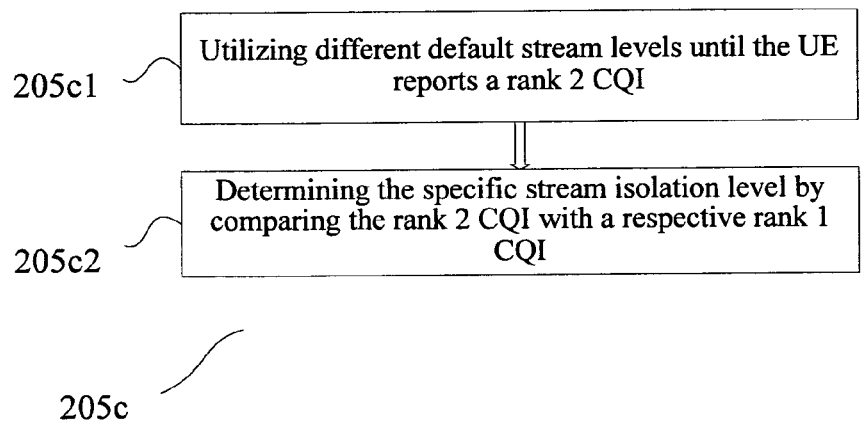
FIG. 11 is a flow chart illustrating a step of determining a specific stream isolation level for the mode of large delay CDD precoding according to an embodiment of the present invention.

Optionally, as shown in FIG. 11, the sub-step 205c further comprises of utilizing different default stream levels until the UE reports a rank 2 CQI, which is denoted as 205c1 in FIG. 11, and determining the specific stream isolation level by comparing the rank 2 CQI with a respective rank 1 CQI, which is denoted as 205c2 in FIG. 11. Optionally, 205c1 and 205c2 can be performed by the above-described the utilizing unit 136a and the fifth determining unit 136b of second determining unit 136 comprised in the first determining unit 130 of the node 100 according to the present invention, respectively.

Optionally, the default stream isolation level may be perfect stream isolation level (stream SINR is 3 dB worse than that in transmit diversity (0 dB) due to power split for 2 steams transmission) and poor stream isolation (stream SINR is 6 dB worse than that in transmit diversity (0 dB) due to power split for 2 steams transmission and inter-stream interference). And when the UE reports a rank 2 CQI, the specific stream isolation level is determined by comparing the rank 2 CQI with a respective rank 1 CQI (0 dB).

Then, in a sub-step 205*d*, a specific beamforming gain for the TM7 of single-layer beamforming is determined. Optionally, the sub-step 205*d* can be performed by the above-described third determining unit 137 comprised in the first determining unit 130 of the node 100 according to the present invention. Optionally, such determination is on the basis of measurement of a sound reference signal or uplink data transmission corresponding to the downlink transmission.

Optionally, an additional beamforming gain of 6 dB or 9 dB on top of a working point is assumed considering the typical antenna setup (eight cross-polarized antennas, half-wavelength spacing between adjacent antenna elements). Those skilled in the art should be aware that more resource elements are occupied as overhead in TM7 due to dedicated reference signal (DRS), thereby the coding rate is higher in TM7 compared to that in rank 1 in TM3. As a result, TM7 needs about 1 dB higher SINR than rank 1 in TM3, in order to achieve the same spectrum efficiency, if we exclude the beamforming gain.

Finally, in a sub-step 205*e*, it is determined, on the basis of results of the first and second link level simulation, a CQM of a cross point where rank 2 in TM3 and TM7 have the same CQM and spectrum efficiency, as the first predefined threshold. Optionally, the sub-step 205*e* can be performed by the above-described fourth determining unit 138 comprised in the first determining unit 130 of the node 100 according to the present invention.

Referring back to FIG. 5 of the simulation graph illustrating normalized efficiency vs. equivalent TxD SINR for rank 1 and rank 2 in TM3 and TM7 according to an embodiment of the present invention. From the above analysis given with reference to FIG. 5, the first predefined thresholds (i.e., the CQM of cross points) can be determined as 12 dB and 15 dB respectively.

Referring back to FIG. 9, the method 200 further comprises a step 207 of switching the transmission mode from the initial transmission mode to the first transmission mode (TM3) or the second transmission mode (TM7) on the basis of the CQM and the first predefined threshold. Optionally, the step 207 can be performed by the above-described first switching unit 140 of the node 100 according to the present invention.

Figure 12:
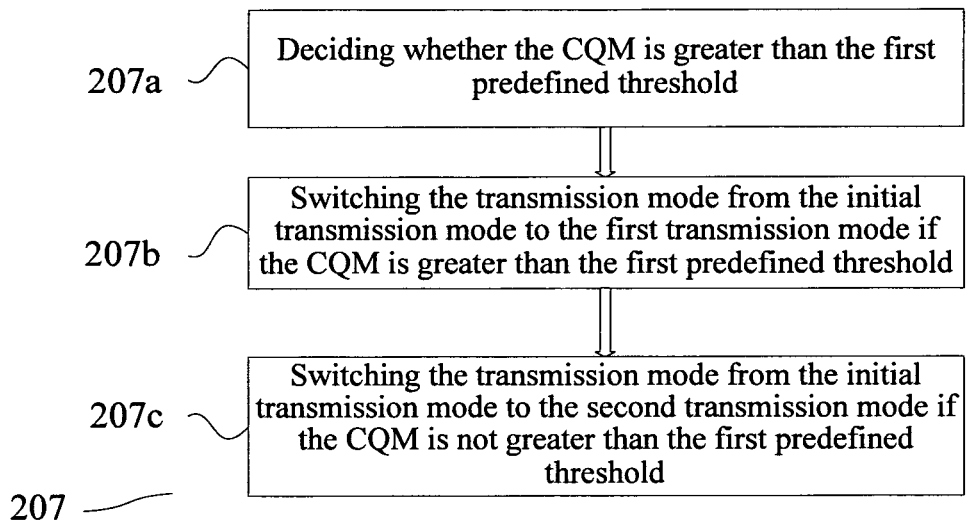
FIG. 12 is a flow chart illustrating a step of switching the transmission mode from the initial transmission mode to the first transmission mode or the second transmission mode on the basis of the CQM and the first predefined threshold according to an embodiment of the present invention.

FIG. 12 is a flow chart illustrating the step 207 according to an embodiment of the present invention. As shown in FIG. 12, the step 207 begins with a sub-step 207*a* of deciding whether the CQM is greater than the first predefined threshold, wherein the CQM is for example the SINR of the downlink channel derived by the two approaches as described above with reference to FIGS. 2 and 3. Optionally, the sub-step 207*a* can be performed by the above-described deciding unit 142 comprised in the first switching unit 140 of the node 100 according to the present invention.

Then, in a sub-step 207*b*, the transmission mode is switched from the initial transmission mode to the first transmission mode (TM3) if the CQM is greater than the first predefined threshold. Optionally, the sub-step 207*b* can be performed by the above-described fourth switching unit 144 comprised in the first switching unit 140 of the node 100 according to the present invention.

Finally, in a sub-step 207*c*, the transmission mode is switched from the initial transmission mode to the second transmission mode (TM7) if the CQM is not greater than the first predefined threshold. Optionally, the sub-step 207*c* can be performed by the above-described fifth switching unit 146 comprised in the first switching unit 140 of the node 100 according to the present invention.

Referring back to the above link-level analysis as illustrated in FIG. 5, it is indicated that the eNB should select either rank 2 in TM3 or TM7 for the concerned UE, i.e. when the SINR is lower than 12 dB or 15 dB, TM7 should be selected; while the SINR is above 12 dB or 15 dB, rank 2 in TM3 should be selected. By doing that, the spectrum efficiency could be maximized. Note that although the above analysis is performed under given assumptions (100 PRBs allocated for data, CFI=2, etc), similar conclusions can be found under other assumptions.

Referring back to FIG. 9, the method 200 further comprises a step 209 of switching, in a periodical manner, the transmission mode between the first transmission mode (TM3) and the second transmission mode (TM7) on the basis of the comparison of the CQM with a second predefined threshold or a third predefined threshold. Optionally, the step 209 can be performed by the above-described second switching unit 150 of the node 100 according to the present invention.

Figure 13:
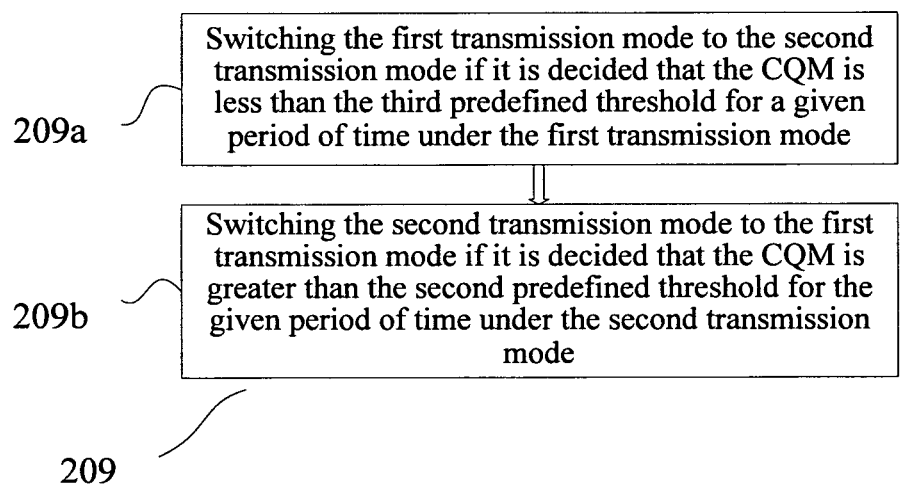
FIG. 13 is a flow chart illustrating a step of switching, in a periodical manner, the transmission mode between the first transmission mode and the second transmission mode on the basis of the comparison of the CQM with a second predefined threshold or a third predefined threshold according to an embodiment of the present invention.

FIG. 13 is a flow chart illustrating the step 209 according to an embodiment of the present invention. As shown in FIG. 13, the step 209 comprises a sub-step 209*a* of switching the TM3 to TM7 if it is decided that the CQM is less than the third predefined threshold for a given period of time under TM3, and a sub-step 209*b* of switching TM7 to TM3 if it is decided that the CQM is greater than the second predefined threshold for the given period of time under TM7, wherein the second predefined threshold is greater than the first predefined threshold, and the first predefined threshold is greater than the third predefined threshold. Optionally, the sub-steps 209*a* and 209*b* can be performed by the above-described sixth switching unit 152 and seventh switching unit 154 comprised in the second switching unit 150 of the node 100 according to the present invention, respectively.

That is, a periodical measurement process of CQM is applied and switching (reconfiguration) between TM3 and TM7 will be triggered when the CQM is less or greater than the predefined third threshold or second threshold for a sufficient long time period. Mathematically, the CQM is periodically updated at eNB. Optionally, the period for switching the transmission mode between TM3 and TM7 is one or more UE measurement report periods.

In order to avoid over-frequent mode switching (reconfiguration), i.e., the ping-pong effect, hysteresis is applied. Further, the above mentioned settings that the second predefined threshold is greater than the first predefined threshold and the first predefined threshold is greater than the third predefined threshold are also made to avoid over-frequent mode switching (reconfiguration). The difference between the second predefined threshold and the first predefined threshold, and the difference between the first predefined threshold and the third predefined threshold can be fixed values, or adaptive to the expected transmission mode switching frequency. Alternatively, the method 200 may comprises a step 211 of switching, in a periodical manner, the transmission mode between the first transmission mode (TM3) and the second transmission mode (TM7) on the basis of link adaptation decision for the downlink channel, in place of the step 209. Optionally, the step 211 can be performed by the above-described third switching unit 150' of the node 100 according to the present invention. The above description of the example of the operations of the third switching unit 150' made with reference to FIG. 8 also applies to the step 211, and is thus not iterated for the sake of conciseness.

Embodiments of the present invention may be implemented in hardware, or as software modules running on one or more processors, or in a combination thereof. That is, those skilled in the art will appreciate that special hardware circuits such as Application Specific Integrated Circuits (ASICs) or Digital Signal Processors (DSPs) may be used in practice to implement some or all of the functionality of all components of the node 100 according to an embodiment of the present invention. Some or all of the functionality of the components of the node 100 may alternatively be implemented by a processor of an application server in combination with e.g. a computer program product comprising a computer readable medium having stored thereon computer executable codes, which computer executable codes when executed on the processor causes the application server to perform, for example, the steps of the method 200 according to an embodiment of the present invention.

The present invention may also be embodied as one or more device or apparatus programs (e.g. computer programs and computer program products) for carrying out part(s) or all of the steps of the method 200 described above. Such programs embodying the present invention may be stored on computer readable medium, or could, for example, be in the form of one or more signals. Such signals may be data signals downloadable from an Internet website, or provided on a carrier signal, or in any other forms.

Thus, the present invention provides a simple, direct and efficient approach for transmission mode switching for downlink transmission in a downlink channel on the basis of available feedback from UE (or other kinds of terminals if appropriate) and/or link adaptation decisions from eNB (or other kinds of base stations if appropriate), provides high peak rate while maintaining cell coverage, and provides a proprietary solution without any impact on protocol/standard or UE implementation.

It should be noted that the aforesaid embodiments are exemplary rather than limiting the present invention, substitute embodiments may be designed by those skilled in the art without departing from the scope of the claims enclosed. The word "include" does not exclude elements or steps which are present but not listed in the claims. The word "a" or "an" preceding the elements does not exclude the presence of a plurality of such elements. In the apparatus claims that list several components, several ones among these components can be specifically embodied in the same hardware item. The use of such words as first, second, third does not represent any order, which can be simply explained as names.

The invention claimed is:

1. A node for transmission mode switching for downlink transmission in a downlink channel, comprising:
    a configuring unit that configures an initial transmission mode for the downlink transmission as a default transmission mode;
    a deriving unit that derives channel quality metric (CQM) of the downlink channel;
    a first determining unit that determines a first predefined threshold on the basis of link level simulation of a first transmission mode and a second transmission mode; and
    a first switching unit that switches the transmission mode from the initial transmission mode to the first transmission mode or the second transmission mode on the basis of the CQM and the first predefined threshold.

2. The node according to claim 1, further comprising a second switching unit that switches, in a periodical manner, the transmission mode between the first transmission mode and the second transmission mode on the basis of the comparison of the CQM with a second predefined threshold or a third predefined threshold, or a third switching unit that switches, in a periodical manner, the transmission mode between the first transmission mode and the second transmission mode on the basis of link adaptation decision for the downlink channel.

3. The node according to claim 1, wherein the downlink channel is a physical downlink shared channel (PDSCH) for Long Term Evolution (LTE) system.

4. The node according to claim 3, wherein the default transmission mode is transmission mode 2 (TM2) of transmit diversity, the first transmission mode is transmission mode 3 (TM3) of open-loop spatial multiplexing including a mode of transmit diversity with rank 1 and a mode of large delay cyclic delay diversity (CDD) precoding with rank 2, and the second transmission mode is transmission mode 7 (TM7) of single-layer beamforming.

5. The node according to claim 1, wherein the deriving unit derives the CQM on the basis of channel quality indicator (CQI) reported by a user equipment (UE) and/or the link adaptation decision, in which the link adaptation decision is provided at evolved Node B (eNB).

6. The node according to claim 4, wherein the first determining unit comprises:
    a first simulation unit that performs first link level simulation for the mode of large delay CDD precoding with rank 2 included in the TM3 of open-loop spatial multiplexing with different stream isolation levels;
    a second simulation unit that performs second link level simulation for the TM7 of single-layer beamforming with different beamforming gains;
    a second determining unit that determines a specific stream isolation level for the mode of large delay CDD precoding and a third determining unit adapted to determine a specific beamforming gain for the TM7 of single-layer beamforming; and
    a fourth determining unit that determines, on the basis of results of the first and second link level simulation, a CQM of a cross point where the mode of large delay CDD precoding and the TM7 of single-layer beamforming have the same CQM and spectrum efficiency, as the first predefined threshold.

7. The node according to claim 6, wherein the second determining unit comprises:
    a utilizing unit that utilizes different default stream levels until the UE reports a rank 2 CQI; and
    a fifth determining unit that determines the specific stream isolation level by comparing the rank 2 CQI with a respective rank 1 CQI.

8. The node according to claim 6, wherein the third determining unit determines the specific beamforming gain on the basis of measurement of a sound reference signal or uplink data transmission corresponding to the downlink transmission.

9. The node according to claim 1, wherein the first switching unit comprises:
    a deciding unit that decides whether the CQM is greater than the first predefined threshold;
    a fourth switching unit that switches the transmission mode from the initial transmission mode to the first transmission mode if the CQM is greater than the first predefined threshold; and a fifth switching unit that switches the transmission mode from the initial transmission mode to the second transmission mode if the CQM is not greater than the first predefined threshold.

10. The node according to claim 2, wherein the second switching unit comprises:
a sixth switching unit that switches the first transmission mode to the second transmission mode if it is decided that the CQM is less than the third predefined threshold for a given period of time under the first transmission mode; and
a seventh switching unit that switches the second transmission mode to the first transmission mode if it is decided that the CQM is greater than the second predefined threshold for the given period of time under the second transmission mode,
wherein the second predefined threshold is greater than the first predefined threshold, and the first predefined threshold is greater than the third predefined threshold.

11. The node according to claim 2, wherein the period for switching the transmission mode between the first transmission mode and the second transmission mode is one or more UE measurement report periods.

12. The node according to claim 2, wherein the CQM is equivalent signal-to-interference-plus-noise ratio (SINR) corresponding to the mode of transmit diversity with rank 1 included in the TM3 of open-loop spatial multiplexing.

13. The node according to claim 1, wherein the node is a component of an evolved Node B (eNB) for Long Term Evolution (LTE) system.

14. A method of transmission mode switching for downlink transmission in a downlink channel, comprising:
configuring an initial transmission mode for the downlink transmission as a default transmission mode;
deriving channel quality metric (CQM) of the downlink channel;
determining a first predefined threshold on the basis of link level simulation of a first transmission mode and a second transmission mode; and
switching the transmission mode from the initial transmission mode to the first transmission mode or the second transmission mode on the basis of the CQM and the first predefined threshold.

15. The method according to claim 14, further comprising switching, in a periodical manner, the transmission mode between the first transmission mode and the second transmission mode on the basis of the comparison of the CQM with a second predefined threshold or a third predefined threshold, or on the basis of link adaptation decision for the downlink channel.

16. The method according to claim 14, wherein the downlink channel is a physical downlink shared channel (PDSCH) for Long Term Evolution (LTE) system.

17. The method according to claim 16, wherein the default transmission mode is transmission mode 2 (TM2) of transmit diversity, the first transmission mode is transmission mode 3 (TM3) of open-loop spatial multiplexing including a mode of transmit diversity with rank 1 and a mode of large delay cyclic delay diversity (CDD) precoding with rank 2, and the second transmission mode is transmission mode 7 (TM7) of single-layer beamforming.

18. The method according to claim 14, wherein the step of deriving CQM of the downlink channel comprises deriving the CQM on the basis of channel quality indicator (CQI) reported by a user equipment (UE) and/or the link adaptation decision, in which the link adaptation decision is provided at evolved Node B (eNB).

19. The method according to claim 17, wherein the step of determining a first predefined threshold on the basis of link level simulation of a first transmission mode and a second transmission mode comprises the steps of:
performing first link level simulation for the mode of large delay CDD precoding with rank 2 included in the TM3 of open-loop spatial multiplexing with different stream isolation levels;
performing second link level simulation for the TM7 of single-layer beamforming with different beamforming gains;
determining a specific stream isolation level for the mode of large delay CDD precoding and a specific beamforming gain for the TM7 of single-layer beamforming; and
determining, on the basis of results of the first and second link level simulation, a CQM of a cross point where the mode of large delay CDD precoding and the TM7 of single-layer beamforming have the same CQM and spectrum efficiency, as the first predefined threshold.

20. The method according to claim 19, wherein the step of determining a specific stream isolation level for the mode of large delay CDD precoding comprises the steps of:
utilizing different default stream levels until the UE reports a rank 2 CQI; and
determining the specific stream isolation level by comparing the rank 2 CQI with a respective rank 1 CQI.

21. The method according to claim 19, wherein the step of determining a specific beamforming gain for the TM7 of single-layer beamforming comprises determining the specific beamforming gain on the basis of measurement of a sound reference signal or uplink data transmission corresponding to the downlink transmission.

22. The method according to claim 14, wherein the step of switching the transmission mode from the initial transmission mode to the first transmission mode or the second transmission mode on the basis of the CQM and the first predefined threshold comprises the steps of:
deciding whether the CQM is greater than the first predefined threshold;
switching the transmission mode from the initial transmission mode to the first transmission mode if the CQM is greater than the first predefined threshold; and
switching the transmission mode from the initial transmission mode to the second transmission mode if the CQM is not greater than the first predefined threshold.

23. The method according to claim 15, wherein the step of switching the transmission mode between the first transmission mode and the second transmission mode on the basis of the comparison of the CQM with a second predefined threshold or a third predefined threshold comprises the steps of:
switching the first transmission mode to the second transmission mode if it is decided that the CQM is less than the third predefined threshold for a given period of time under the first transmission mode; and
switching the second transmission mode to the first transmission mode if it is decided that the CQM is greater than the second predefined threshold for the given period of time under the second transmission mode,
wherein the second predefined threshold is greater than the first predefined threshold, and the first predefined threshold is greater than the third predefined threshold.

24. The method according to claim 15, wherein the period for switching the transmission mode between the first transmission mode and the second transmission mode is one or more UE measurement report periods.

25. The method according to claim 17, wherein the CQM is equivalent signal-to-interference-plus-noise ratio (SINR)

corresponding to the mode of transmit diversity with rank 1 included in the TM3 of open-loop spatial multiplexing.

26. A computer program product, comprising a non-transitory computer readable medium having stored thereon computer executable instructions for performing the method of claim 14.

\* \* \* \* \*